United States Patent [19]

Wang

[11] Patent Number: 5,164,470
[45] Date of Patent: Nov. 17, 1992

[54] POLYMER COMPOSITIONS

[75] Inventor: Pen C. Wang, Houston, Tex.

[73] Assignee: Shell Oil Company, Houston, Tex.

[21] Appl. No.: 747,063

[22] Filed: Aug. 19, 1991

[51] Int. Cl.$^5$ .............................................. C08G 77/04
[52] U.S. Cl. ...................................... 528/26; 528/27; 528/38
[58] Field of Search .............................. 528/26, 27, 38

[56] References Cited

U.S. PATENT DOCUMENTS 4,701,511 10/1987 Valenty ................................. 528/26
4,935,489 6/1990 Wang ................................... 524/174

Primary Examiner—Melvyn I. Marquis

[57] ABSTRACT

Novel polymers containing silicon moieties and moieties of a 1,6-diaza [4.4] spirodilactam are produced by reaction of an aminohydrocarbyl silyl compound and a spirodilactam precursor selected from ketodicarboxylic acid compound or a 1,6-dioxa [4.4] spirodilactone.

19 Claims, No Drawings

POLYMER COMPOSITIONS

FIELD OF THE INVENTION

The present invention relates to certain novel silicon-containing polymers and to cured products produced from certain of these polymers. More particularly, the invention relates to polymers containing moieties of a 1,6-diaza [4.4] spirodilactam and moieties derived from an amino-substituted silane.

FIELD OF THE INVENTION

Broad classes of organic compounds which incorporate one or more moieties of 1,6-diaza [4.4] spirodilactam are known from a series of U.S. patents to Wang, e.g., U.S. Pat. Nos. 4,939,251, and 4,935,489. The products are monomeric, as in the case of the compounds of U.S. Pat. No. 4,939,251, or are polymeric as in the case of the compounds of U.S. Pat. No. 4,935,489. Such spirodilactam compounds demonstrate a wide variety of applications, particularly those spirodilactam-containing compounds which are polymeric. Certain of the polymeric spirodilactam polymers are linear in character and are typically thermoplastic, while others of the polymeric products are crosslinked and as a result are thermoset. The polymers are often characterized by relatively high glass transition temperatures, in part because of the polycyclic structure.

The presence within a polymeric molecule of silicon-containing groups provides advantages in properties of the polymer, particularly when the silicon functionality is a hydrolyzable silyl group. See, for example, Bruylants et al, U.S. Pat. No. 4,945,145. Such polymers typically exhibit flexibility, solvent resistance and adhesion. It would therefore be of advantage to provide silicon-containing polymeric products which also incorporate within the polymer molecule moieties of a spirodilactam.

SUMMARY OF THE INVENTION

The present invention provides polymeric products which incorporate silicon-containing moieties as well as moieties of a 1,6-diaza [4.4] spirodilactam. More particularly, the invention provides such polymers which (1) are linear with alternating moieties of spirodilactam and silylcontaining moieties, or (2) are of less clearly defined structure, but both of which lead to crosslinked polymeric products with relatively high glass transition temperature.

BACKGROUND OF THE INVENTION

The present invention relates to silicon-containing polymers, also containing moieties of a 1,6-diazaspiro[4.4]nonane-2,7-dione, which are produced by the reaction of a primary amino-containing silicon compound and a spirodilactam precursor selected from 4-ketodicarboxylic acid compounds or spirodilactones of corresponding structure. In one modification, the spirodilactam precursor is a ketodicarboxylic acid compound having two carbon atoms between the central keto functionality and each carboxylic acid function. Expressed differently, the ketodiacid compound is a 4-oxoheptanedioic acid compound. Although a variety of such ketodiacid compounds are useful as precursors of the compounds of the invention, the preferred ketodiacid compounds have up to 30 carbon atoms inclusive and are represented by the formula

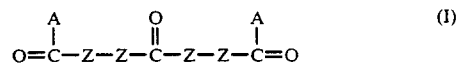

wherein A independently is hydroxy, alkoxy, preferably lower alkoxy of up to 4 carbon atoms inclusive, or halo, preferably the middle halogens chloro and bromo, and Z independently is $>C(Z')_2$ in which $Z'$ independently is hydrogen; alkyl, preferably lower alkyl, of up to 4 carbon atoms inclusive, preferably methyl; halo, but preferably the lower halogens fluoro or chloro; aryl of up to 10 carbon atoms inclusive, preferably phenyl; or Z is such that two adjacent Z groups taken together form a ring system $Z''$ of from 5 to 7 ring atoms, up to two of which are heteroatoms selected from nitrogen, oxygen or sulfur with the remainder of the ring atoms being carbon atoms, there being up to 15 carbon atoms inclusive in each $Z''$, two of which serve to connect the carbon atoms connected by the adjacent Z groups. When the Z moieties are taken together to form the ring system $Z''$, the ring is cycloaliphatic, aromatic or heterocyclic and is hydrocarbon containing only atoms of carbon and hydrogen besides any heteroatoms of the ring or is substituted hydrocarbon containing atoms such as halogen in the form of inert substituents.

In one embodiment employing a ketodiacid compound spirodilactam precursor, each Z moiety is acyclic or not part of a ring system and each Z is $>C(Z')_2$ and the ketodiacid compound is an acyclic 4-oxoheptanedioic acid compound. In this embodiment, the spirodilactam precursor preferably has at least one hydrogen on each carbon atom adjacent to an acid functionality and is of the formula

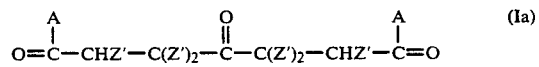

wherein A and $Z'$ have the previously stated meanings. Such 4-oxoheptanedioic acid compounds include 4-oxoheptanedioic acid, dimethyl 4-oxoheptanedioate, 2,6-dimethyl-4-oxoheptanedioic acid, 2,3,5,6-tetramethyl-4-oxoheptanedioyl chloride, 3,5-diethyl-4-heptanedioic acid, dipropyl 2,6-di-n-butyl-4-oxoheptanedioate and 6-carbomethoxy-3,3,5,5-tetramethyl-4-oxohexanoic acid. The preferred ketodiacid compounds of the above formulas I and Ia are those wherein each $Z'$ is hydrogen or methyl, preferably hydrogen, and each A is hydroxy or methoxy, preferably hydroxy. The compounds of the above formulas I and Ia are known compounds or are produced by known methods, particularly the method of U.S. Pat. No. 4,800,231. Conversion of the esters produced thereby to corresponding free acids or acid halides is by conventional methods as is the interconversion of acids, esters or acid halides of formulas I or Ia in general to obtain the 4-oxoheptanedioic acid compounds.

In a second embodiment of the ketodiacid compound spirodilactam precursor the 4-ketodiacid incorporates cyclic moieties between the keto group and each acid function, i.e., adjacent Z groups are $Z''$. Such cyclic diacid compounds are represented by the formula

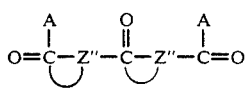 (II)

wherein A and Z" have the previously stated meaning. Illustrative of these cyclic ketodiacids are di(2-carboxyphenyl) ketone, di(2-carbethoxyphenyl) ketone, di(2-carboxycyclohexyl) ketone, di(2-carbopropoxycyclo-4-pentenyl) ketone, di(2 chlorocarbonylphenyl) ketone, di(2-carboxypyridyl) ketone, 2-carboxyphenyl, N-methyl-3-carboxy-2-pyrryl ketone, di(3-carbomethoxy-2-morpholyl) ketone and di(3-carboxy-2-naphthyl) ketone. The preferred cyclic ketodicarboxylic acid compounds are those wherein each Z" is a ring system of 5 to 6 carbon atoms inclusive and up to 1 nitrogen heteroatom. Such dicyclic 4-ketodiacid compounds are known compounds or are produced by known methods such as the method described by U.S. Pat. No. 1,999,181 or by Cava et al, J. Am. Chem. Soc., 77, 6022 (1955).

In yet another embodiment of the ketodiacid compound spirodilactam precursor the ketodiacid incorporates one acyclic moiety and one cyclic moiety, e.g., the compounds represented by the formula

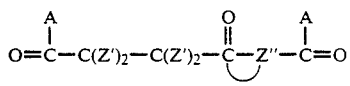 (III)

wherein A, Z' and Z" have the previously stated meanings. Such ketodiacid compounds of one cyclic moiety are illustrated by 3-(2-carboxybenzoyl)propionic acid, 3-(2-carbomethoxy-2-pyridyloyl)-2-ethylproprionic acid, ethyl 3-(2-carbethoxybenzolyl)propionate and 3-(2-carboxy-4-methyl)butyrl chloride. The ketodiacid compounds of one cyclic moiety of formula III are known compounds or are produced by known methods.

In a second modification of the invention, the spirodilactam precursor is a 1,6-dioxospiro[4.4]nonane-2,7-dione wherein the ring system carbon atoms are unsubstituted (except for hydrogen) or substituted with other groups or form part of other cyclic moieties. One class of such spirodilactones is of the formula

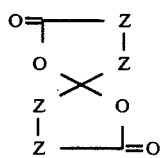 (IV)

wherein Z has the previously stated meaning. In the embodiment of the spirodilactone spirodilactam precursor wherein each Z moiety is >C(Z')₂, the precursor is represented by the formula

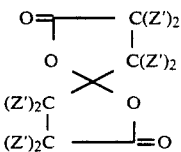 (V)

wherein Z' has the previously stated meaning. Illustrative of such spirodilactones are 1,6-dioxaspiro[4.4]nonane-2,7-dione, 3,8-dimethyl-1,6-dioxaspiro[4.4]nonane-2,7-dione, 3,4,8,9-tetramethyl-1,6-dioxaspiro[4.4]-nonane-2,7-dione, 4,9-diphenyl-1,6-dioxaspiro[4.4]nonane-2,7-dione, 3,4,8,9-tetrafluoro-1,6-dioxaspiro[4.4]nonane-2,7-dione and 3,3,4,4,8,8,9,9-octamethyl-1,6-dioxaspiro[4.4]nonane-2,7-dione. The preferred spirodilactones of formula VI are those where at least one Z' of each Z'-substituted carbon atom is hydrogen. Such compounds are known compounds or are produced by known methods such as the process of Pariza et al, Synthetic Communications, Vol. (13) 3, pp. 243-254 (1983.

In the embodiment of the spirodilactone spirodilactam precursor which incorporates a cyclic moiety as a portion of each of the two rings of the spirodilactone ring system, the spirodilactones are represented by the formula

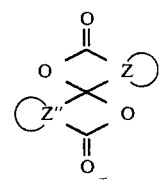 (VI)

wherein Z" has the previously stated meaning. Typical compounds of this formula are 3,4,8,9-dibenzo-1,6-dioxaspiro[4.4]nonane-2,7-dione, 3,4,8,9-di(cyclopentano)-1,6-dioxaspiro[4.4]nonane-2,7-dione, 3,4,8,9-di(4-methylbenzo)-1,6,-dioxaspiro[4.4]nonane-2,7-dione and 3,4,8,9-di(pyridino)-1,6-dioxaspiro[4.4]nonane-2,7-dione. These compounds of formula VI are known compounds or are produced by known methods, for example, the process described by Cava et al, J. Am. Chem. Soc., 79 1706-1709 (1959) or the process described in U.S. Pat. No. 1,999,181.

In a third embodiment of the spirodilactone spirodilactam precursor one cyclic moiety is fused to one of the spiro rings and the other spiro ring is free of fused ring substituents. Such spirodilactones are represented by the formula

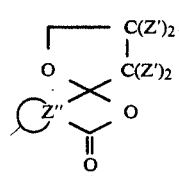 (VII)

wherein Z' and Z" have the previously stated meanings. Such spirodilactones with a ring fused to one but not both spiro rings are illustrated by 3-methyl-8,9-benzo-1,6-dioxaspiro[4.4]nonane-2,7-dione, 8,9-benzo-1,6-dioxaspiro[4.4]nonane-2,7-dione and 3,3,4,4-tetramethyl-8,9-morpholino-1,6-dioxaspiro[4.4]nonane-2,7-dione. Spirodilactones of the above formula VII are known compounds or are produced by known methods such as the dehydration of the corresponding ketodiacids. For example, 3-(2-carboxybenzoyl)propionic acid is dehydrated by application of heat to produce 3,4-benzo-1,6-dioxaspiro[4.4]nonane-2,7-dione.

In general, the preferred spirodilactone spirodilactam precursors are hydrocarbon except for the oxygen atoms of the lactone moieties, particularly those free from fused cyclic substituents (formula V) or which have a fused ring substituent on each spiro ring (formula VI). Specifically preferred spirodilactone spirodilactam precursors are 1,6-dioxaspiro[4.4]nonane-2,7-dione and 3,4,8,9-dibenzo-1,6-dioxaspiro[4.4]nonane-2,7-dione.

The polymeric products of the invention are produced by reacting the spirodilactam precursor with a primary amino-substituted silicon compound to produce a polymeric product having at least one moiety of 1,6-diazaspiro[4.4]nonane-2,7-dione with silicon-containing substituent on each spiro ring nitrogen atom. The primary amino-substituted silicon compounds useful in the preparation of the polymers of the invention are compounds having at least one primary amino hydrocarbyl silyl moiety wherein the remaining valences of the silicon are satisfied by alkyl of up to 10 carbon atoms inclusive, aryl of up to 10 carbon atoms inclusive, alkoxy of up to 10 carbon atoms inclusive or a hydrocarbon linking group of up to 10 carbon atoms inclusive to a second primary amino hydrocarbyl silyl moiety. Preferred aminohydrocarbyl silyl compounds are represented by the formula

wherein R is alkylene or arylene of up to 10 carbon atoms inclusive, R' independently is of up to 10 carbon atoms inclusive and is alkyl, aryl or alkoxy, E is R' or

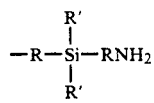

wherein R and R' have the previously stated meaning. Illustrative of amino silyl compounds of the above formula VIII are 2-aminoethyltriethoxysilane, 4-aminophenyltripropoxysilane, 3-amino-5-methylphenylmethoxydiethoxysilane, (8-aminooctyl)-(2-aminoethyl)-dimethoxysilane, 3-aminocyclohexyldimethylmethoxysilane, 6-aminohexyltricyclohexyloxysilane, 1,4-bis[(3-aminopropyl)dimethylsilyl]benzene, 1,6-bis[(2-aminoethyl)dimethoxysilyl]hexane, 4-aminobutyldiethylethoxysilane and 1,3-bis[(10-aminodecyl)dimethylsilyl]-4-methylbenzene. Particularly preferred as the aminohydrocarbyl silyl reactants are the compounds of the above formula VIII wherein E and each R' are alkoxy, especially methoxy, and R is alkylene of up to 6 carbon atoms inclusive or phenylene.

The aminohydrocarbyl silyl reactant and the spirodilactam precursor are contacted under reaction conditions to produce the polymer products of the invention. In one embodiment, the reaction takes place in liquid phase solution in the presence of an inert polar diluent such as N,N-dimethyl-2-pyrrolidone, dimethylsulfoxide or tetrahydrofuran. In an alternate embodiment, however, the reactants are contacted in the substantial absence of inert diluent by merely mixing the reactants and maintaining the resulting mixture under reaction conditions.

Typical reaction conditions include a reaction temperature of from about 100° C. to about 190° C., preferably from about 135° C. to about 185° C. The reaction pressure is that pressure sufficient to maintain the reaction mixture in the liquid phase. Such pressures are up to about 10 atmospheres but pressures from about 0.8 atmosphere to about 5 atmospheres are preferred. The molar ratio of aminohydrocarbyl silyl compound to spirodilactam precursor is suitably from about 5:1 to about 1:5. In the embodiment wherein E of the above formula VIII contains silicon, the preferred molar ratios of aminohydrocarbyl silyl compound to spirodilactam precursor are from about 2:1 to about 1:2. In the embodiment wherein E of the above formula VIII does not contain silicon, preferred molar ratios are from about 4:1 to about 1:2.

The contact of the reactants is facilitated by some means of agitation such as shaking or stirring. Subsequent to reaction, in the embodiment where reaction diluent is used, the polymer product is recovered upon removal of the diluent as by filtration or distillation. In the embodiment where the reaction is conducted in the absence of reaction diluent, the product is typically used as produced.

The product of the reaction of the aminohydrocarbyl silyl compound and the spirodilactam precursor will vary, depending in part upon the nature of the silyl compound. When the aminohydrocarbyl silyl compound is a compound of the above formula VIII wherein E is

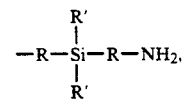

the polymer product is an alternating polymer wherein moieties derived from the aminohydrocarbyl silyl compound alternate with moieties of a spirodilactam. Upon reaction of either the ketodiacid spirodilactam precursor (formula I) or the spirodilactone spirodilactam precursor (formula IV) and the aminohydrocarbyl silyl compound of formula VIII wherein E is —R—Si(R'-)$_2$—R—NH$_2$, the products are represented by the repeating formula

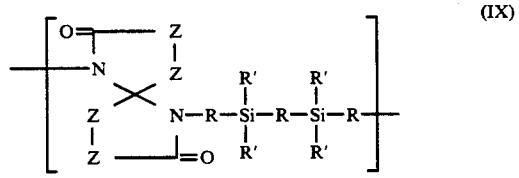

wherein Z, R and R' have the previously stated meaning. When the spirodilactam precursor of either formula I or formula IV is reacted with an aminohydrocarbyl silyl compound wherein E is R', a somewhat different type of polymer is produced of a structure not easily characterized. The polymeric products of this embodiment of the process of the invention are likely lightly crosslinked derivatives of a spirodilactam of the formula

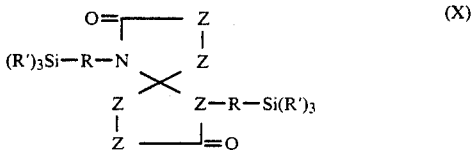

wherein R, R' and Z have the previously stated meanings. The crosslinking of this polymer is extended, i.e., the polymer is cured, by heating of the lightly-crosslinked initial polymer at a temperature of above about 190° C. and preferably a temperature from about 195° C. to about 225° C. The more lightly crosslinked polymer is produced in one step by heating the aminohydrocarbyl silyl compound and spirodilactam precursor at a temperature above about 190° C., but better results are produced if the reactants are heated at a reaction temperature below about 190° C. and subsequently heated at the more elevated temperature. In this modification, isolation or characterization of the intermediate lightly crosslinked polymer is not required.

The polymers of the invention are thermoplastic in the case of the alternating polymers produced from aminohydrocarbyl silyl compounds of formula VIII wherein E is not R'. Such polymers are processed by methods conventional for thermoplastics into a variety of shaped articles, e.g., films, fibers and containers, which have established utility. In the case of the polymers produced from arylhydrocarbyl silyl compounds of the above formula VIII wherein E is R', the more highly crosslinked polymers produced by heating at the more elevated temperatures are thermoset polymers. Such polymers are processed by methods conventional for thermoset polymers and are useful in the production of circuit boards for electrical and electronic applications.

The invention is further illustrated by the following Illustrative Embodiments which should not be regarded as limiting.

ILLUSTRATIVE EMBODIMENT I

A mixture of 5 g (0.0166 mole) of 1,4-bis(3-aminopropyldimethylsilyl)benzene and 2.6 g (0.0166 mole) of 1,6-dioxaspiro[4.4]nonane-2,7-dione was placed in a 100 ml round bottom flask equipped with a mechanical stirrer and a condenser. The mixture, while being stirred, was heated to a temperature of 170° C.–180° C. and maintained at that temperature range for 12 hours. The reaction mixture was then cooled and the polymer product was isolated as a hard resin with a glass transition temperature of 67° C.

ILLUSTRATIVE EMBODIMENT II

A mixture of 25.0 g (0.14 mole) of 3-aminopropyltrimethoxysilane and 10.9 g (0.07 mole) of 1,6-dioxaspiro[4.4]nonane-2,7-dione was placed in a 100 ml resin pot and warmed to 150° C.–160° C. while being stirred. After maintaining these conditions for 2 hours, the reaction mixture became a polymeric gel. Curing of the resulting gel at 200° C. for 4 hours produced a hard resin. No glass transition temperature was observed below 300° C.

ILLUSTRATIVE EMBODIMENT III

A mixture of 10 g (0.047 mole) of p-aminophenyltrimethoxysilane and 3.66 g (0.0235 mole) of 1,6-dioxaspiro[4.4]nonane-2,7-dione was placed in a 100 ml resin pot equipped with a mechanical stirrer and a condenser. While being stirred, the mixture was heated to 150° C.–160° C. and maintained at that temperature for 2 hours. The observed product was a polymer gel. The gel was cured at 200° C. for 4 hours to give a hard resin. No glass transition temperature was observed below 300° C.

What is claimed is:

1. The silicon-containing polymer obtained by reacting a spirodilactam precursor selected from 4-ketodicarboxylic acid compounds or 1,6-dioxo [4.4] spirodilactones with an aminohydrocarbyl silyl compound of the formula

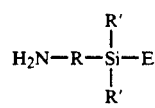

wherein R is alkylene or arylene of up to 10 carbon atoms inclusive, R' independently has up to 10 carbon atoms inclusive and is alkyl, aryl or alkoxy, E is R' or

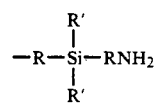

wherein R and R' have the previously stated meaning.

2. The polymer of claim 1 wherein the spirodilactam precursor is selected from the 4-ketodicarboxylic acid of the formula

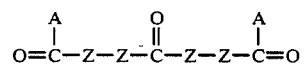

or the spirodilactone of the formula

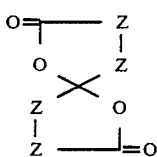

wherein A independently is hydroxy, lower alkoxy, chloro or bromo, and Z independently is $>C(Z')_2$ in which Z' independently is hydrogen, alkyl, halo or aryl of up to 10 carbon atoms, or Z is such that two adjacent Z groups taken together form a ring system Z'' of from 5 to 7 ring atoms, up to two of which are heteroatoms selected from nitrogen, oxygen or sulfur with the remainder of the ring atoms being carbon atoms, there being up to 15 carbon atoms in each Z'', two of which serve to connect the carbon atoms connected by the adjacent Z groups.

3. The polymer of claim 2 wherein the spirodilactam precursor is 4-ketodicarboxylic acid.

4. The polymer of claim 3 in which each Z is $>C(Z')_2$.

5. The polymer of claim 4 wherein each R' and E are alkoxy.

6. The polymer of claim 5 wherein Z' is hydrogen.

7. The polymer of claim 6 wherein each R' and E are methoxy and R is alkylene of up to 6 carbon atoms inclusive or phenylene.

8. The polymer of claim 7 wherein R is ethylene.
9. The polymer of claim 7 wherein R is phenylene.
10. The polymer of claim 4 wherein E is

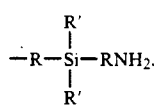

11. The polymer of claim 10 wherein R' is alkyl.
12. The polymer of claim 11 wherein R is alkylene of up to 6 carbon atoms or phenylene.
13. The polymer of claim 12 wherein R is ethylene.
14. The polymer of claim 2 wherein the spirodilactam precursor is a spirodilactone.
15. The polymer of claim 14 wherein each R' and E are alkoxy.
16. The polymer of claim 15 wherein adjacent Z moieties are Z".
17. The polymer of claim 16 wherein R is alkylene of up to 6 carbon atoms inclusive or phenylene.
18. The polymer of claim 17 wherein Z" is benzo.
19. The polymer of claim 18 wherein each R' and E are methoxy.

* * * * *